United States Patent [19]

Christensen

[11] 4,284,652

[45] Aug. 18, 1981

[54] MATRIX, PRODUCT THEREWITH, AND PROCESS

[75] Inventor: Edwin H. Christensen, Western Springs, Ill.

[73] Assignee: The Quaker Oats Company, Chicago, Ill.

[21] Appl. No.: 11,401

[22] Filed: Feb. 12, 1979

Related U.S. Application Data

[63] Continuation of Ser. No. 761,956, Jan. 24, 1977, abandoned.

[51] Int. Cl.³ .............................................. A23L 1/30
[52] U.S. Cl. ...................................... 426/72; 426/250; 426/311; 426/321; 426/331; 426/332; 426/335; 426/532; 426/656; 426/657; 426/658; 426/805
[58] Field of Search ................ 426/72, 250, 311, 321, 426/331, 332, 335, 532, 656, 657, 658, 805

[56] References Cited

U.S. PATENT DOCUMENTS

| | | | |
|---|---|---|---|
| 3,516,838 | 6/1970 | Du Puis | 99/150 |
| 3,615,652 | 10/1971 | Burgess et al. | 99/7 |
| 3,883,672 | 5/1975 | Bone et al. | 426/311 |
| 3,959,511 | 5/1976 | Balaz et al. | 426/805 X |
| 3,962,462 | 6/1976 | Burkwall, Jr. et al. | 426/805 X |
| 3,974,296 | 8/1976 | Burkwall, Jr. | 426/657 X |
| 3,984,576 | 10/1976 | Burkwall, Jr. et al. | 426/656 X |
| 4,006,266 | 2/1977 | Bone et al. | 426/656 X |
| 4,011,345 | 3/1977 | Bartsch | 426/72 |
| 4,015,026 | 3/1977 | Burkwall, Jr. et al. | 426/805 X |
| 4,022,915 | 5/1977 | Zuckerman | 426/72 |
| 4,039,689 | 8/1977 | Bone | 426/250 X |
| 4,039,692 | 8/1977 | Clausen | 426/532 |

*Primary Examiner*—Robert J. Warden
*Attorney, Agent, or Firm*—Charles J. Hunter; Mathew R. P. Perrone, Jr.

[57] ABSTRACT

A matrix comprising starch, fat, polyhydric alcohol and water results in a soft, pliable, and stretchable composition having an excellent palatability. To this matrix may be added sufficient protein and other nutritional ingredients to form a suitable food. An especially suitable food which may be thus formed is a soft dry pet food. This soft dry pet food may be mixed with a hard dry pet food.

41 Claims, No Drawings

MATRIX, PRODUCT THEREWITH, AND PROCESS

CROSS REFERENCE TO RELATED APPLICATIONS

This application is a continuation of U.S. Pat. application Ser. No. 761,956, filed Jan. 24, 1977, now abandoned.

BACKGROUND OF THE INVENTION

This invention relates to food, and more particularly to a matrix which may be used to form a suitable food capable of being used alone or in mixture with other foods.

In the food art to make a particular type of food, it is usually necessary to assemble individual components and mix them in a particular order at an appropriate time to achieve the desired results. Keeping each of these individual components creates many problems. For example, each component may require separate storage. In some cases, the components must be stored separately because they cannot be mixed prior to use and retain stability. This problem exists even though there are a number of common components in a variety of foods. If some way can be found to stabilize a mixture of some common components in a food, then the storage capabilities of these common components are simplified. If these components can be mixed, it is feasible to store the mixture and not use separate storage facilities for each component. In addition to the storage advantages of using such common components in a wide variety of foods to form the mixture, it is also possible to achieve a composition or matrix which may greatly simplify processing and forming of foods in other arts. To form a composition or matrix having these capabilities is an advantage to the food arts in general. Additionally the composition can be particularly useful in the pet food art.

Within the class of foods known as pet foods there are three basic subdivisions—dry pet food, semi-moist pet food, and moist pet food. The moisture is determined by considering both the water present in the final product and the water combined with the various components that make up the final product. In general, the dry pet food—due to its low moisture content which is usually less than about 15 percent—tends to exhibit the greatest microbiological stability and requires no special handling or packaging upon distribution.

At the opposite end of the spectrum is the moist pet food having a moisture content in excess of about 50 percent. Due to the high moisture content of the moist pet food, microbiological stability is a major problem. This problem in a moist pet food is overcome only by heat sterilizing the moist pet food and packaging the moist pet food in a hermetically sealed container. Even with the heat sterilization and hermetically sealed package, refrigeration is required after the package of moist pet food is opened to preserve the leftover pet food for even a short time.

Semi-moist pet food has a moisture content generally ranging from about 15 percent to about 50 percent. Since semi-moist pet foods are higher in moisture content than dry and lower in moisture than canned, special techniques are required to render it microbiologically stable. This moisture content in combination with special techniques may produce a microbiologically stable food which does not require refrigeration. At the same time, the higher moisture content of the semi-moist pet food provides an increased palatability when compared to the dry pet food. The semi-moist pet food is generally rendered microbiologically stable by using appropriate combination of appropriate solutes. In this fashion, shelf stability without refrigeration is achieved while providing a food having increased palatability relative to dry pet food.

When considering palatability, the moist pet foods are the most palatable and the dry pet foods are least palatable. The semi-moist pet foods fall somewhere in between the moist and dry pet foods as to palatability. Thus dry pet food has both advantages and disadvantages.

One of the reasons for the lack of consumer and animal acceptance of a dry pet food is its poor palatability in relation to a semi-moist or moist pet food. A second reason for the lack of consumer and animal acceptance for a dry pet food is the hard, brittle characteristic thereof. This hard, brittle characteristic detracts from the overall appearance and texture of the product. This hard, brittle characteristic also distinguishes the dry pet food from the semi-moist or moist pet food. One advantage, however, that a hard abrasive textured pet food has, is that it contributes to teeth cleaning of the pet.

One possible solution for improving the palatability of the dry pet food is adding water thereto. While such addition of water provides a somewhat increased palatability, the product is more susceptible to microbiological deterioration. Thus it cannot be left out at room temperature for the pet to eat for more than a few hours before it has to be discarded. Also the water softens and moistens the hard, brittle pieces and almost all of the teeth cleaning attributes are lost. This solution, therefore, is not suitable because the desired teeth cleaning attributes are sacrificed to achieve palatability. The problems are not offsetting. Thus, this solution does not provide a desirable result.

A second way to increase palatability is to mix foods with semi-moist or canned pet foods. However, such mixtures usually result in rapid textural changes in the respective components. Moisture transfers from the semi-moist or canned component to the dry component, causing its inherent hard texture to become soft. Similarly, loss of moisture from the semi-moist component caused their inherent, soft, elastic meat-like textures to become hard. This creates two problems. The conventional dry dog food which is now soft has its teeth cleaning attributes reduced or eliminated. The semi-moist product, which is now dry and brittle, but not hard and abrasive, results in a product having reduced palatability. Also, with either a semi-moist or a canned product, the moisture that transfers to the dry product will render the dry product microbiologically unstable. Thus, this mixture of dry and semi-moist or dry and canned product requires immediate consumption by the pet in order to avoid the textural instability and the onset of the microbiological spoilage that inherently occurs.

Some attempts to manufacture a dry pet food that is soft and palatable are known. Some progress is evident in the field of manufacturing a soft dry pet food alone. However, the products thus formed do not have the desirable teeth cleaning characteristics inherent in a dry pet food of the hard type, and the palatability has been suspect. So, while there are two different types of dry pet food, hard dry pet food and soft dry pet food,— there is no dry pet food on the market combining the attributes of the hard pet food with its teeth cleaning benefit and the soft dry pet food with its palatability and textural benefits.

A further problem in the manufacture and usage of soft, dry pet foods is that despite all attempts to the contrary they become hard upon storage. This hardness developing upon storage destroys the effect desired. It is desired to maintain the softness over a substantial period of time to retain the inherent values of having the softness while at the same time maintaining the storage stability. A number of attempts to overcome the problem of foods becoming brittle during storage is known in the art. Some attempts to form a soft dry pet food involve the use of lecithin as a fat transporting and cohesive agent to achieve the desired softness. Other attempts to make a soft dry pet food are known which have used expensive proteinaceous adhesives or other protein sources which are difficult to obtain in combination with starch and plasticizing agents to form a soft dry pet food. Because of the availability or high cost of these proteinaceous adhesives, and other ingredients, these products are not commercially feasible. Also the softness of these products is retained for only a short period of time when the product is stored at room temperature.

Thus it is clearly desirable to provide a means for making a foodstuff that retains its softness for long periods of time, if possible, and can be mixed with a hard foodstuff without losing its integrity, and is economical to produce. It is especially desirable if this means may be applied to the making of soft dry pet food. It is furthermore desirable to produce a matrix or base that can be used as a starting point for many types of soft products. The soft dry pet food thus produced is especially advantageous if it provides for excellent palatability in a soft product. If this soft product can be mixed with a hard dry pet food as known in the art, the advantages of palatability for the soft piece and teeth cleaning attributes of the hard piece may be achieved in the same food.

SUMMARY OF THE INVENTION

Therefore, it is an object of this invention to provide a matrix suitable for use in forming a food.

It is a further object of this invention to provide a matrix suitable for use in forming a soft, dry pet food.

It is a still further object of this invention to provide a soft, dry pet food requiring no proteinaceous adhesives.

Yet a further object of this invention is to provide a soft, dry pet food which maintains its desirable characteristics over a long period of storage.

Also, an object of this invention is to provide a dry pet food which has a mixture of hard components and soft components.

Another object of this invention is to provide a process for making a matrix suitable for use in a wide variety of foods.

Yet another object of this invention is to provide a process for making a soft, dry pet food.

Still another object of this invention is to provide a process for making a pet food having both a soft component and a hard component.

It is a further object of this invention to provide a dry pet food having improved palatability.

A still further object of this invention is to provide a dry pet food having improved palatability and hardness characteristics.

These and other objects of the invention are achieved by forming a matrix comprising a starch, a fat, a polyhydric alcohol, and water. This matrix may serve as a base for forming a wide variety of foods. For example, this matrix may serve as the base for forming a soft, dry pet food. This soft, dry pet food is suitable for use alone or mixed with a hard, dry pet food.

DESCRIPTION OF THE PREFERRED EMBODIMENTS

A matrix is formed by combining a starch, a fat, a polyhydric alcohol, and water in suitable ratios such that a stable dispersion of the starch, fat, polyhydric alcohol, and water is formed. Into this homogeneous mixture of starch, fat, polyhydric alcohol and water, may be incorporated suitable non functional nutritional elements such as a non functional protein source and a sugar source to provide a soft, dry pet food.

The matrix relies on critical amounts of starch, fat, polyhydric alcohol, and water to form a stable matrix. Particular types of starch and fat in combination with water and polyhydric alcohol are also critical for forming the matrix. Into this stable matrix, which is both a dispersion and homogeneous mixture of starch, fat, polyhydric alcohol and water, various nutritional elements are incorporated. The ratio of starch, fat, polyhydric alcohol, water and types of starch, fat, and water is critical for forming the matrix in a stable fashion.

Generally speaking, the starch component of the matrix comprises 10 to 90 percent by weight of the matrix. More particularly, the starch component of the matrix comprises 15 to 80 percent by weight of the matrix. Most specifically, the starch component of the matrix comprises 20 to 50 percent by weight of the matrix.

While starch for use in the matrix can be of any suitable type, it is most preferred that at least part of the starch in the matrix be a highly derivatized starch. Typical examples of a highly derivatized starch are found in U.S. Pat. No. 3,705,891 to Tuschhoff et al. and U.S. Pat. No. 3,725,386 to Hanson et al. both patents being incorporated herein by reference. If a highly derivatized starch is present in the matrix, it should be present in an amount of at least ½ percent by weight of the matrix and the balance of the starch being non-derivatized. More preferably, about 2 percent to 25 percent by weight of the matrix must be the derivatized starch. Most preferably about 5 to about 20 percent by weight of the matrix is a highly derivatized starch. An example of this type of starch is A. E. Staley's Nu-Col 4227. However, the derivatized starch must not be of such an amount so as to have the total starch content of the matrix exceed the starch limits set forth above.

To reemphasize, other amylaceous ingredients may be used in combination with the derivatized starch or alone, provided the starch limits are not exceeded. The amylaceous ingredients can be gelatinized or cooked before or during the forming step to achieve the desired matrix characteristics. However, if ungelatinized (ungelled) or uncooked starch is used, the matrix must be cooked sufficiently to gel or cook the starch.

Starches that can serve as base starch for derivatization include regular corn, waxy corn, potato, tapioca, rice etc. The types of derivatizing agents for the starch include but are not limited to ethylene oxide, propylene oxide, acetic anhydride, and succinic anhydride, and other food approved esters or ether introducing chemicals used alone or in combination with one another. Prior crosslinking of the starch may or may not be necesssary based on the pH of the system and the temperature used to form the product. The use level of this starch is not to be limited by the above percent but rather can be used as a complete replacement of all starches if necessary to achieve the desired physical properties.

By "amylaceous ingredients" is meant those foodstuffs containing a preponderance of starch and/or starch-like material. Examples of amylaceous ingredients are cereal grains and meals or flours obtained upon grinding cereal grains such as corn, oats, wheat, milo, barley, rice, and the various milling by-products of these cereal grains such as wheat feed flour, wheat middlings, mixed feed, wheat shorts, wheat red dog, oat groats, hominy feed, and other such material. Also included as sources of amylaceous ingredients are the tuberous foodstuffs such as potatoes, tapioca, and the like. Other examples of amylaceous ingredients are the various edible grain or tuberous starches and modified cooked or otherwise treated starches such as those discussed in U.S. patent application Ser. No. 620,720 filed Oct. 8, 1975, by Bone and Shannon now U.S. Pat. No. 4,006,266, incorporated herein by reference. Mixtures of these various starches may also be used.

Another component of the matrix is a fat component such as fat or oil of animal or vegetable origin. Typical animal fats or oils are fish oil, chicken fat, tallow, choice white grease, prime steam lard and mixtures thereof. Other animal fats are also suitable for use in the matrix. Vegetable fats or oils are derived from corn, soy, cottonseed, peanut, flax, rapeseed, sunflower, other oil bearing vegetable seeds, and mixtures thereof. Additionally, a mixture of animal or vegetable oils or fats is suitable for use in the matrix. The fat component of the matrix is about 5 to about 55 percent by weight of the matrix. More specifically, the fat component of the matrix is about 10 to about 40 percent by weight of the matrix. Most specifically, the fat component of the matrix is 15 to 30 percent by weight of the matrix.

The polyhydric alcohol component of the matrix can be a component selected from the polyhydric alcohols listed in U.S. Pat. No. 3,759,714 to Burkwall. Also, mixtures of these polyhydric alcohols may be used in the matrix. Particularly suitable for the matrix are glycerol, sorbitol, propylene glycol, 1,3-butanediol, and mixtures thereof with each other and other polyhydric alcohols. Generally, the polyhydric alcohol comprises about 3 to about 50 percent by weight of the matrix. More specifically, the polyhydric alcohol comprises about 6 to about 40 percent by weight of the matrix. Most specifically, the polyhydric alcohol is about 8 to about 35 percent by weight of the matrix.

Water must be present in the matrix at least about 5 percent by weight of the matrix. More specifically, water is present in the matrix at about 5 percent to about 40 percent by weight of the matrix. Most specifically, water is present in the matrix at about 15 to about 30 percent by weight of the matrix. The matrix thus formed usually has a water activity of 0.60 to 0.75.

While water must be at least 5 percent by weight of the matrix, when the matrix is used in a pet food, the moisture of the pet food must be adjusted. Generally the moisture content of the matrix is such to give a moisture content of 5-15 percent to the final soft dry pet food product. More preferred is a moisture content of 5 percent to 14 percent. Most preferred is a moisture content of 8 percent to 13 percent. The desired moisture content may be achieved in any suitable fashion. Normal processing may produce the moisture content desired. A standard drying step is optional and may be used if necessary. The moisture level must be met.

To form the matrix, the starch system, fat, polyhydric alcohol, and water are mixed. If a red coloration is desired in the final product, cooked or pregelled starches are used to form the matrix. The use of these starches avoids high cooking temperatures which would destroy the desired red coloration. If coloration is not a problem, it is possible to use an uncooked or ungelatinized starch to form the matrix and cook or gel the starch as the process is carried out. The incorporation of a derivatized starch in the product more clearly guarantees the softness of the product for a longer period of time. In this fashion a suitable matrix for use in forming a wide variety of foods may be formed.

Having thus formed the matrix, it is now possible to form a wide variety of foods. The matrix is a soft, pliable, elastic substance which is microbiologically stable in and of itself and retains softness on storage and in which may have incorporated therein various flavors and nutrients to provide a suitable food.

One type of food that may be formed using this matrix is a soft, dry pet food. Because the formed matrix is generally lacking in protein, but for a small amount imparted by the amylaceous ingredients, it is typically necessary to incorporate into this pet food a protein source. The protein source used must be non-functional—that is lacking of adhesive characteristics. An adhesive type of protein such as sodium caseinate, a collagen, an alkali modified soy protein or other proteinaceous adhesives causes the matrix to become very sticky and difficult to process, handle, and even package. The protein source is customarily present in an amount of 10 to 50 percent by weight of the pet food. More preferably the protein source comprises 15 to 40 percent by weight of the pet food. Most preferably, the protein source comprises 20 to 30 percent by weight of the pet food. The protein source may be a vegetable protein source, an animal protein source, or mixtures thereof so long as the necessary protein content is met.

By "vegetable protein source" is meant those vegetable ingredients normally containing 20 percent or more protein by weight. Example of vegetable protein sources are soybean oil meal, soybean flour, soy protein concentrate, soy protein isolates, cottonseed meal, cottonseed flour, cottonseed protein concentrates, cottonseed protein isolates, peanut meal, peanut flour, peanut protein concentrates, peanut protein isolates, corn germ, corn germ meal, wheat germ, wheat germ meal, corn gluten meal, corn gluten feed, corn distiller's dried grains, dried corn distiller's solubles and any other edible proteinaceous vegetable foodstuff taken singly or in mixtures thereof which are not suitable as proteinaceous adhesives.

By animal protein source is meant a meat, a meat by-product or mixtures thereof as defined in U.S. Pat. No. 3,380,832 to Bone incorporated herein by reference. The animal protein source may also be used alone or in combination with the vegetable protein source in the above percentage ranges, so long as the total required protein content as above defined is met. By meat is meant the flesh of cattle, swine, sheep, goats, horses, whale and other mammals, poultry, and fish. By meat by-products is meant those things shown in the 1976 Association of American Feed Control Officials, Inc. under No. 9 Animal Products, Section 9.3 Page 77 which defines meat by-products as the non-rendered clean wholesome part other than meat derived from slaughtered animals. Meat by-products include, but are not limited to lungs, spleen, kidneys, brain, livers, blood, partially defatted low temperature fatty tissue and stomachs and intestines freed of their contents. If it bears the name descriptive of its kind, it must correspond thereto (proposal 1973, adopted 1974—N.R.C. 5-00-395). Animal protein also includes a dried animal by-product (a meal) including such materials as animal liver meal, animal liver and glandular meal, extracted animal liver meal, whale meal, meat and bone meal, animal by-product meal, dried meat solubles, meat meal, fish meal, fish protein concentrate, poultry parts, poultry by-products, poultry by-product meal, and blood meal.

Generally speaking, any one of the above named meat, meat by-products or animal protein or vegetable protein products may be used in the dry pet food of this invention so long as the products are not classed as proteinaceous adhesives. Also mixtures of two or more of the meat, meat by-products or other animal protein sources may be used in this soft, dry type pet food. Additionally, meat, meat by-products and other animal protein source mixtures with vegetable protein are suitable for use in the pet food of this invention.

As indicated, the protein source is either a vegetable protein source, an animal derived protein source, a dried animal by-product, or a combination thereof. The critical thing about the protein source is that it provide the nutritional and legal requirements for the protein in the product. Generally speaking, the protein content on a dry basis in the pet food must be at least 15 percent, and more preferably 22 percent to 40 percent. Other levels are supplied depending on the type of pet being fed. A dog food protein content is advantageously about 15 percent to less than 30 percent by weight of the pet food on a dry basis while a cat food protein content is advantageously about 30 percent or above by weight on a dry basis. The adjustment in the levels of the protein source raise the protein content on a dry basis to the required level for the particular pet.

The protein source is not needed to give texture or hold together the product, because the matrix itself provides the desired texture and softness. By non-functional to repeat—is meant that the protein provides no adhesive character for the pet food and does not contribute to the texture thereof. This is in contrast with the prior art wherein a proteinaceous adhesive is required to form a soft, dry pet food.

Vitamins, minerals, colors, flavors, and other known supplements may be used as well to enhance the pet food properties. Included in the vitamin and mineral supplements are ingredients such as choline chloride, magnesium oxide, vitamin A, $B_{12}$, $D_3$, and E, riboflavin, niacin, folic acid, pyridoxine hydrochloride, thiamine mononitrate, calcium pantothenate and other suitable vitamins and minerals. Also, a sufficient amount of antimycotic may be added to the pet food if necessary to prevent mold. Such supplements are commonly used up to about 5 percent of the final product. Other ingredients such as a sugar source, coloring, vitamins or minerals can be added to give the desired appearance and enhance the palatability even more if desired.

The above described ingredients may be incorporated into the matrix in any suitable fashion. Standard processes for forming such foods are known in the art and may be applied to the novel matrix, and whatever ingredients are desired to be added to the matrix for nutritional purposes. By using the matrix, the known processes may be modified to achieve the desired results in accordance with this invention. If a derivatized starch, pregelatinized starch, precooked starch, or mixtures thereof are used, no cooking is necessary to complete the formulation of the soft dry pet food or other food. If all, or part of the starch is not gelatinized, or cooked, some cooking is necessary to gelatinize or cook the ungelatinized or uncooked portion of the starch. In some cases, even the derivatized starch is not completely cooked or gelatinized, and is cooked or gelatinized in this fashion. The desired cooking temperatures are easily determined based on the type of the starch.

Another aspect of the present invention involves combining the soft dry component with a hard dry pet food component to obtain the benefits of the added palatability of the soft dry pet food and the teeth cleaning properties of the hard dry pet food. One step of this combination involves processing a hard component of a dry pet food that is substantially amylaceous and proteinaceous in nature and having a moisture content of 5–15 percent and a critical water activity of 0.60–0.75. (The concept of water activity is defined in U.S. Pat. No. 3,380,832 to Bone incorporated herein by reference.) Then the hard component is admixed with the processed soft component while avoiding substantial change in texture, appearance, or keeping qualities in either the hard component or the soft component during prolonged storage as a dry dog food.

Generally, the hard component of this invention having a moisture content from 5–15 percent and a water activity of 0.60–0.75 can be produced by blending a mixture of amylaceous ingredients, animal and vegetable protein sources, minerals, and sufficient water for processing and then cooking said mixture by baking or extrusion followed by cooling and drying as required to reduce the moisture content of the product to the desired range. Should the moisture content fall outside the desired range of 5–15 percent adjustments in process water and/or process conditions to obtain the desired moisture level is within the purview of those skilled in the art. If these moisture ranges are maintained, the water activity $A_w$ of the hard dry pet food can be maintained in the desirable 0.60 to 0.75 range. It is important to emphasize that the water activity of both the hard and the soft piece must be approximately the same. In other words, the ratio of $A_w$ should be 0.90–1.10 for the two pieces.

While keeping in mind the above referenced limitations with regard to water activity for the hard component, the compositions may be made in any suitable fashion to form the hard component. Typical compositions to form the hard component are disclosed in U.S. patent application Ser. No. 620,720 of Bone and Shannon filed Oct. 8, 1975, and now U.S. Pat. No. 4,006,266. Generally speaking, the hard component comprises about 10 to about 30 percent by weight of a vegetable protein source, about 20 to about 60 percent by weight amylaceous ingredients, about 5 percent to about 15 percent fat, and about 5 percent to about 25 percent of an animal protein source—all percentages herein being based on the weight of the hard component. Typically, the hard component has a moisture content of 5 to 15 percent and more preferably 8 to 12 percent by weight. By adjusting the water activity of this component so that it substantially matches the water activity of the soft component, an extremely stable mixture of soft, dry pet food and hard, dry pet is achieved.

Relative hardnesses of the hard component and the soft component are measured in this case, under conditions set forth by The Food Technology Corporation, 12300 Parklawn Drive, Rockville, Md. 20852. This organization has designed a Texture Press which is given the designation TP-1 or TP-2. This texture press includes a Universal Cell known as the CE-1. This cell works equally well on the Instron TC-M testing device. The cell is a hollow cylinder having a parallel grid base designed to test consistency of heavy gels, shortening, dough, and similar products. The apparent viscosity of more fluid products may also be determined by using this cell. This particular cell is used on the Instron device to determine hardness. Generally speaking, the peak force in this cell used to test the various components shows softness. The lower numbers for the test results give a product an indication of softness. That is, the lower numbers indicate a softer product. For example, a standard hard dry pet food tests on this cell in excess of 500 kilograms load. Standard semi-moist pet foods test out in the range of about 100 to 200 kilograms load. The soft dry pet food of this invention generally tests out at a range of 50 to 120 kilograms load. Thus, it may be seen that the product of this invention is much softer than the hard dry standard pet foods by a substantial margin and ranks softer than, or with the softness of a semi-moist pet food.

If the soft component and the hard component are combined to form a composite dry pet food, the soft component comprises about 10 percent to about 90 percent by weight of the composite. More preferably, the soft component comprises about 20 percent to about 80 percent. Most preferably, the soft component comprises 30 percent to 70 percent by weight of the composite. In each case the balance of the composite is the hard pet food component. This combination includes both the palatability of the soft piece and the teeth cleaning attributes of the hard piece.

Having thus fully described the invention, the following examples are presented to illustrate the invention without limiting the invention. In these examples all parts percentages are by weight unless otherwise specified.

EXAMPLE 1

The following ingredients are mixed to form a suitable matrix.

| Ingredient | Percent |
| --- | --- |
| Propylene glycol | 30 |
| Water | 5.4 |
| Tallow | 29 |
| Derivatized corn flour | 8 |
| Precooked corn flour | 27.6 |
| | 100.00 |

The above ingredients are mixed to form a matrix. By merely mixing these ingredients, a soft, pliable matrix is achieved. No cooking is required in this example since the corn flour is derivatized or precooked.

EXAMPLE 2

The procedure of Example 1 is repeated but for the replacing of the derivatized corn flour with precooked corn flour. This product is extruded. A stable shapeable matrix is formed. The resultant product is soft but nevertheless a little harder to the touch than the product of Example 1. This example clearly illustrates the advantage of the derivatized corn flour to form a stable matrix.

EXAMPLE 3

The procedure of Example 1 is repeated but for the replacing of the precooked corn flour with highly derivatized corn flour. A suitable matrix is formed.

EXAMPLE 4

The procedure of Example 2 is repeated but for using uncooked corn flour. Added to the procedure is cooking of the mixture sufficiently to gel the corn flour. A suitable matrix is formed. This procedure clearly illustrates the necessity for cooking the matrix when an ungelled starch or uncooked starch is used. Insufficient cooking produces a doughy, crumbly, non-cohesive product impossible to form and, therefore, lacking desired texture.

EXAMPLE 5

A soft, dry pet food is formed as follows: 75 percent by weight of the pet food is comprised as a matrix formed in Example 1. Added to the matrix formed in Example 1 is 5 percent corn syrup and 20 percent corn gluten meal. The matrix is mixed with the corn gluten meal, the corn syrup, and a sufficient amount of edible red dye to form a dough. This dough is extruded at a temperature of 55° C. The product which exudes from the extruder is formed into strandular meat-like products having the appearance of raw hamburger and cut to the desired shape. The resultant product has a water activity in the area of 0.65 and a moisture content of about 11 percent by weight. The resultant product is soft. After a storage period of three months, the product remains soft without separation into its components.

EXAMPLE 6

The precooked corn flour of Example 1 is replaced with a starch derived polysacchride of the malto dextrose type (known as Maltrin 10) from the Grain Processing Company. An extremely sticky viscous fluid is formed which upon extrusion at 110° F. remains extremely sticky. As a result of this stickiness the viscous fluid does not form a piece of definite shape, but rather sticks to the cutter. Thus, precooked corn flour in this example is shown to be critical for the matrix of this invention.

EXAMPLE 7

Tallow, water, 1,3-butanediol, and derivatized corn starch are mixed to form a matrix. The water comprises 13.5 percent by weight of the matrix. The tallow comprises 19.2 percent and the starch comprises 45.2 percent by weight of the matrix. The remainder of the matrix is 22.1 percent 1,3-butanediol. These four components are added together and mixed in a standard mixer. After a storage period of three months, the matrix remains soft—without separation into its components.

EXAMPLE 8

To the matrix of Example 7 is added sufficient material to make a nutritional soft dry pet food. The matrix comprises 55 percent by weight of the pet food. Added to the matrix are a salt and vitamin mixture in the amount of 4 percent, corn syrup (42 dextrose equivalent) 5, soy flour at 25 percent, 11.0 percent meat and bone meal, and a sufficient amount of color to provide a red coloration for the pet food. The resultant mixture is extruded to form small strands of pet food and thereby provide a suitable pet food for use in feeding of pets.

EXAMPLE 9

The procedure of Example 7 is used except that the water comprises 21.0 percent, the tallow comprises 30 percent, the 1,3-butanediol comprises 10 percent and the corn starch comprises 39.0 percent by weight of the matrix. A suitable matrix is formed by extrusion cooking.

EXAMPLE 10

The matrix of Example 9 is selected to form a soft dry pet food and comprises 50 percent by weight of the pet food. To the matrix of Example 9 is added 4 percent salt and vitamin mixture, 13.5 percent corn syrup, 21 percent corn gluten meal, 11.5 percent soy flour, and a sufficient amount of coloring to provide a red coloration for the pet food. The pet food is then extruded in the form of small strands to thereby provide a suitable pet food.

EXAMPLE 11

A composite pet food having both a soft component and a hard component is formed. The product of the composite is formed by mixing 60 percent by weight of the composite of the pet food from Example 8 and 40 percent by weight of the composite of a hard dry pet food having a water activity of 0.65, a moisture content of 8 percent and formed in a standard fashion with components listed:

| Ingredients (Hard Dry) | Parts by Weight |
|---|---|
| Wheat flour | 65.5 |
| Meat & Bone Meal | 12.5 |
| Soybean Meal | 10.0 |
| Animal Fat | 4.5 |
| Oat Flour | 4.2 |
| Vitamin, Mineral, Salt | 4.3 |
| Water for processing | 10.0 |

Upon storage, the product retains its soft dry characteristics and its hard dry characteristics thereby providing both a meat-like taste and the crunchy hardness of a hard dry pet food to retain teeth cleaning attributes and other desired attributes of a hard pet food.

EXAMPLE 12

The following ingredients are assembled:

TABLE I

| MATRIX FORMULATION | | | | |
|---|---|---|---|---|
| | A Weight in grams | B % Matrix | C % Food | |
| Water | 156 | 9.7 | 5.2 | |
| Propylene Glycol | 420 | 25.9 | 14.0 | |
| Tallow | 339 | 20.9 | 11.3 | 54.1 Matrix |
| Pregelled Oat Flour | 458 | 28.3 | 15.3 | |
| Derivatized Corn starch (Nucol 4227 from A. E. Staley Co.) | 247 | 15.2 | 8.2 | |
| | 1620 | 100.0 | | |

TABLE II

| FINAL PRODUCT | | | |
|---|---|---|---|
| | A Weight in grams | B % Food | |
| Matrix | 1620 | 54.1 | |
| Salt, Vitamins minerals | 120 | 4.0 | |
| Corn syrup 42 DE | 432 | 14.4 | |
| Corn gluten meal | 732 | 24.5 | 45.9 non-functional additive |
| Soy Flour | 93 | 3.1 | |
| | 2997 | | |

Table I shows ingredients used to form a matrix. Column A shows the weight of each component used in grams. Column B shows the percent by weight of the matrix. Column C shows the percent by weight of the pet food for the ingredients used in the matrix. The indicated ingredients for the matrix are mixed to form a suitable matrix. Table II shows the ingredients used to form the soft dry pet food as a final product. To the matrix is added the indicated amount of non-functional ingredients by standard mixing procedures to form a dough. The product is formed by cold extruding a dough. The resultant product is tested on an Instron device using the above described universal cells. Three tests are run on three different samples of the product. A 100 gram sample of the product is finger packed into a test cell. A truncated-cone piston is used to minimize shear affects at the edge of the cell. The test cell is mounted on a 500 kilogram compression load cell operating at (full load=full scale). The cross head speed in these tests is 1 centimeter per minute as is the recorder chart speed. For each sample of the product of this example the results of the cell were 84, 85, and 85 kilograms load which illustrates the reproducibility of the test and the softness of this pet food.

EXAMPLE 13

The soft dry component of Example 12 is fed against the hard dry pet food disclosed in Example 11. The soft dry component clearly outfeeds and is preferred by the test animals at 99 percent significance with 88 percent of the soft dry product being consumed to 12 percent of the hard dry product. Also, when the same test animals are fed a 60:40 mixture of soft dry and hard dry pet food, against the hard dry and the soft dry pet foods, the pet food mixture is preferred over the hard dry pet food alone at 99 percent signficance with 74 percent consumption of the mixture and 21 percent hard pet food. Thus the soft piece is shown to enchance the palatability of the hard dry piece.

EXAMPLE 14

The procedure of Example 12 for testing softness is repeated on a commercially available semi-moist pet food having the appearance of hamburger (Ken-L-Ration Burger available from The Quaker Oats Company). This process is also repeated on a hard dry pet food (Ken-L-Ration Biskit available from The Quaker Oats Company) as an example of the hard dry pet food available on the market. For the semi-moist product, the three samples test out at 120, 120, and 119, kilograms load. The hard dry product tests out in excess of 500 kilograms load which is beyond the cell capacity. Because of the lower numbers shown for the product of Example 13, it is concluded that the product of Example 13 is softer than either a standard, hard dry pet food or a standard semi-moist pet food.

Obviously, modifications of this invention are possible. It is understood, therefore, that this application is intended to cover any variations, uses, or adaptations of the invention as may be considered to be known or customary practice in the art to which this invention pertains.

Having fully described and disclosed the invention, what is claimed and desired to be secured by Letters Patent of the United States is:

1. A soft dry pet food consisting of about 10 to about 50 percent of a non-adhesive, non-functional animal or vegetable protein source by weight of the pet food, a sufficient amount of vitamins and minerals to form a nutritious pet food, and 50 percent to 90 percent of a matrix by weight of the pet food wherein the matrix consists of:
   (a) about 10 to about 90 percent of at least one amylaceous ingredient by weight of the matrix wherein at least ½ percent based on the weight of the matrix is a derivatized starch;
   (b) about 5 to about 55 percent of at least one fat component by weight of the matrix;
   (c) about 3 to about 50 percent of at least one polyhydric alcohol by weight of the matrix; and
   (d) at least 5 percent water by weight of the matrix.

2. The soft dry pet food of claim 1 having a moisture content of 5 to 15 percent.

3. The soft dry pet food of claim 2 having a water activity $A_2$ in the range of 0.60 to 0.75.

4. The soft dry pet food of claim 3 wherein the protein source is at least one vegetable protein source selected from the group consisting of soybean oil meal, soybean flour, soy protein concentrate, soy protein isolate, cottonseed meal, cottonseed flour, cottonseed protein concentrates, cotton protein isolates, peanut meal, peanut flour, peanut protein concentrate, peanut protein isolate, corn germ, corn germ meal, wheat germ, wheat germ meal, corn gluten meal, corn gluten feed, corn distiller's dried grains, and dried corn distiller's solubles.

5. The soft dry pet food of claim 3 wherein the protein source is an animal protein source.

6. The soft dry pet food of claim 5 wherein the animal protein source is an animal meal.

7. The soft dry pet food of claim 6 wherein the protein source is a mixture of the animal meal and vegetable protein sources.

8. The soft dry pet food of claim 7 wherein the protein source is present in the pet food at 15 to 40 percent and provides a protein content for the pet food of at least 15 percent on a dry basis.

9. The dry pet food of claim 8 wherein the amylaceous ingredient is 15 to 80 percent by weight of the matrix.

10. The soft dry pet food of claim 9 wherein the amylaceous ingredient is derived from oat groats.

11. The pet food of claim 9 wherein the fat component is a fat or oil comprising 10 to 40 percent by weight of the matrix and is a vegetable fat or oil derived from corn, soy, cottonseed, peanut, flax, rapeseed, sunflower, and mixtures thereof.

12. The soft dry pet food of claim 11 wherein the fat or oil further comprises at least one animal fat or oil selected from the group consisting of fish oil, chicken fat, tallow, choice white grease, and prime steam lard.

13. The soft dry pet food of claim 12 wherein the polyhydric alcohol comprises 6 to 40 percent by weight of the pet food and is at least one selected from the group consisting of glycerol, propylene glycol, and 1,3-butanediol.

14. The soft dry pet food of claim 13 wherein the pet food further comprises corn syrup having a dextrose equivalent of from about 10 to about 60.

15. The soft, dry pet food of claim 9 wherein the starch content of the matrix comprises about 2 to about 25 percent derivatized starch.

16. The soft, dry pet food of claim 15 wherein the derivatized starch comprises about 5 to about 20 percent by weight of the matrix.

17. A process for making a soft, dry pet food consisting of:
   (a) forming a matrix wherein the matrix consists of 10 to 90 percent of an amylaceous ingredient based on the weight of the matrix wherein at least ½ percent of the amylaceous ingredient based on the weight of the matrix is a derivatized starch; 5 to 55 percent of a fat component based on the weight of the matrix; 3 to 50 percent of at least one polyhydric alcohol based on the weight of the matrix; and at least 5 percent water by weight of the matrix; wherein the matrix comprises 50 to 90 percent by weight of the soft dry pet food;
   (b) adding to the matrix 10 to 50 percent by weight of a non-adhesive, non-functional animal or vegetable protein source; and a sufficient amount of vitamins and minerals to form an admixture;
   (c) mixing the admixture to form a dough;
   (d) cooking the dough sufficiently to gelatinize or cook any part of the amylaceous ingredient that is uncooked, ungelatinized, or underivatized;
   (e) shaping the cooked dough to form the soft, dry pet food; and
   (f) recovering the soft, dry pet food.

18. The process of claim 17 wherein the amylaceous ingredient comprises 15 to 80 percent by weight of the matrix, and the fat comprises 10 to 40 percent by weight of the matrix.

19. The process of claim 18 wherein the amylaceous ingredient comprises 20 to 50 percent by weight of the matrix.

20. The process of claim 17 wherein the amylaceous ingredient comprises 15 to 80 percent by weight of the matrix.

21. The process of claim 17 wherein the amylaceous ingredient comprises 20 to 50 percent by weight of the matrix.

22. The process of claim 21 wherein the derivatized starch comprises 2 to 25 percent by weight of the matrix.

23. The process of claim 22 wherein the derivatized starch comprises 5 percent to 20 percent by weight of the matrix.

24. The process of claim 22 wherein the derivatized starch provides all of the starch in the matrix.

25. A matrix consisting of a dispersed and homogeneous mixture of at least one amylaceous ingredient, fat, at least one polyhydric alcohol, and water wherein the amylaceous ingredient comprises 10 to 90 percent by weight of the matrix with at least ½ percent of the amylaceous ingredient based on the weight of the matrix being a derivatized starch, the polyhydric alcohol comprises 3 to 50 percent by weight of the matrix, the fat comprises 5 to 55 percent by weight of the matrix with at least 5 percent by weight of the matrix being water.

26. The matrix of claim 25 wherein the amylaceous ingredient comprises 15 to 80 percent.

27. The matrix of claim 26 wherein the fat comprises 10 to 40 percent.

28. The matrix of claim 27 wherein the amylaceous ingredient comprises 20 to 50 percent.

29. The matrix of claim 28 wherein 2 percent to 25 percent by weight of the matrix is a derivatized starch.

30. The matrix of claim 29 wherein the derivatized starch comprises 5 percent to 20 percent by weight of the matrix.

31. The matrix of claim 25 wherein the derivatized starch comprises all of the amylaceous ingredient in the matrix.

32. The matrix of claim 31 further comprising sufficient protein to satisfy the nutritional requirements of a pet.

33. A composite dry pet food having 10 to 90 percent by weight of a hard component and 10 to 90 percent by weight of a soft component wherein:
   (A) the hard component consists of 10 percent to 30 percent vegetable protein source, 20 percent to 60 percent amylaceous ingredients, 5 percent to 15 percent fat, and 5 percent to 25 percent animal protein source based on the weight of the hard component;
   (B) the soft component is a soft dry pet food consisting of about 10 to about 50 percent protein source by weight of the pet food, a sufficient amount of vitamins and minerals to form a soft dry pet food, and 50 percent to 90 percent of a matrix by weight of the pet food wherein the matrix consisting of:
      (a) about 10 to about 90 percent of at least one amylaceous ingredient by weight of the matrix with at least ½ percent of the amylaceous ingredient based on the weight of the matrix being a derivatized starch;
      (b) about 5 to about 55 percent of at least one fat component by weight of the matrix;
      (c) about 3 to about 50 percent of at least one polyhydric alcohol by weight of the matrix; and
      (d) at least 5 percent water by weight of the matrix; and
   (C) the ratio of the water activity of hard dry pet food to soft dry pet food is 0.90 to 1.10.

34. The composite pet food of claim 33 having a moisture content of 5 to 15 percent.

35. The composite pet food of claim 34 having a water activity $A_w$ in the range of 0.60 to 0.75.

36. The composite pet food of claim 35 wherein the vegetable protein source is at least one vegetable protein selected from the group consisting of soybean oil meal, soybean flour, soy protein concentrate, soy protein isolate, cottonseed meal, cottonseed flour, cottonseed protein concentrates, cotton protein isolates, peanut meal, peanut flour, peanut protein concentrate, peanut protein isolate, corn germ, corn germ meal, wheat germ, wheat germ meal, corn gluten meal, corn gluten feed, corn distiller's dried grains, and dried corn distiller's solubles.

37. The composite pet food of claim 36 wherein the protein source is an animal protein source.

38. The composite pet food of claim 37 wherein the animal protein source is a meal.

39. The composite food of claim 38 wherein the protein source is a mixture of meal and vegetable protein sources.

40. A process for the production of a dry pet food containing 8-13 percent moisture by weight, and having a component first particle with a water activity of 0.60 to 0.75 that is hard in texture and substantially amylaceous in composition admixed with a component second particle with a water activity of 0.60 to 0.75 that is soft and meat-like in texture and appearance wherein the ratio of the water activity of the hard component to the water activity of the soft component is 0.90 to 1.10, consisting of the steps of:
   (a) blending a first mixture consisting of amylaceous ingredients, animal and vegetable protein source, salt, and sufficient water for processing, wherein said amylaceous ingredient is present in an amount from about 25 to about 60 percent by weight and said salt is present in an amount from 0 to about 2 percent by weight;
   (b) cooking while shaping a mass of said first mixture at a temperature and time sufficient to gelatinize the said amylaceous ingredients;
   (c) forming particles of said first mixture;
   (d) cooling the cooked said first mixture to form the hard component;
   (e) blending a second mixture to form a soft, dry pet food by:
      (1) forming a matrix wherein the matrix consisting of 10 to 90 percent of a starch component based on the weight of the matrix wherein the starch component further comprises at least ½ percent of a derivatized starch based on the weight of the matrix; 5 to 55 percent of a fat component based on the weight of the matrix; 3 to 50 percent of at least one polyhydric alcohol based on the weight of the matrix; and at least 5 percent water by weight of the matrix;
      (2) adding to the matrix a sufficient amount of an animal or vegetable protein source, to form a nutritious pet food; and
      (3) recovering a soft, dry pet food; and
   (f) admixing the hard component and the soft component to form a composite wherein the composite comprises about 10 percent to about 90 percent of the hard component and about 10 percent to about 90 percent of the soft component.

41. A process for forming a matrix suitable for use in the manufacture of a wide variety of foods consisting of:
   (a) admixing 10 to 90 percent by weight of at least one pregelled or precooked amylaceous ingredient, wherein the amylaceous ingredient consists of at least ½ percent by weight derivatized starch, 5 to 55 percent of a fat component, 3 to 50 percent of at least one polyhydric alcohol, and at least 5 percent by weight water;
   (b) blending to form the matrix; and
   (c) recovering the matrix.

* * * * *